Feb. 26, 1924.
C. B. MELCHIOR
Re. 15,777
BOTTLE CAPPING MACHINE
Original Filed Aug. 25, 1919
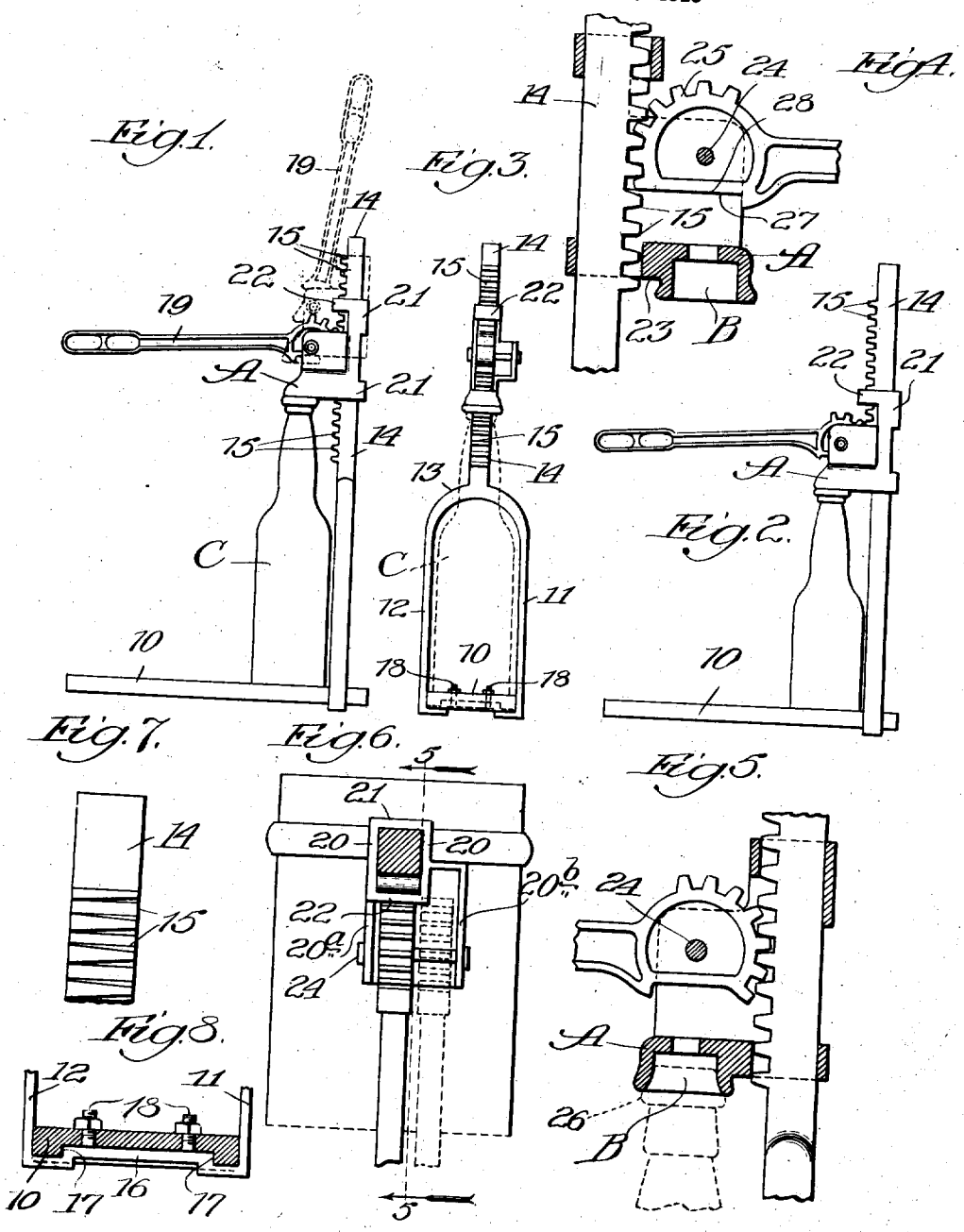
Inventor:
Claude B. Melchior,
By Dyrenforth, Lee, Christy & Sidle,
Attys.

Reissued Feb. 26, 1924.

Re. 15,777

UNITED STATES PATENT OFFICE.

CLAUDE B. MELCHIOR, OF WILMINGTON, DELAWARE, ASSIGNOR TO LIQUID MALTED MILK COMPANY, OF CEDAR RAPIDS, IOWA, A CORPORATION OF IOWA.

BOTTLE-CAPPING MACHINE.

Original No. 1,365,182, dated January 11, 1921, Serial No. 319,839, filed August 25, 1919. Application for reissue filed March 11, 1922. Serial No. 543,075.

*To all whom it may concern:*

Be it known that I, CLAUDE B. MELCHIOR, a citizen of the United States, and formerly a resident of Des Moines, in the county of Polk and State of Iowa, and now a resident of Wilmington, in the county of New Castle and State of Delaware, have invented a certain new and useful Bottle-Capping Machine, of which the following is a specification.

The object of my invention is to provide a bottle capping machine of simple, durable and inexpensive construction.

A further object of my invention is to provide means for fixing the type of caps known as "crown" caps to a bottle in order to seal the bottle.

A further object of my invention is to provide a device of the class mentioned, wherein the movement of the "crown" engaging device may always be in lines parallel to the longitudinal axis of the bottle in order to minimize danger of breaking the bottles.

A further object of my invention is to provide such a device adapted to be actuated by a hand lever, which attains its maximum effectiveness, when it is moved to substantially a horizontal position and to provide in connection with such a lever, means for adjusting the relative vertical position of the cap engaging member, whereby the cap engaging member may be in position to seal bottles of various sizes and heights when the lever is in horizontal position.

A further object of my invention is to provide a platform having a supporting member extending upwardly with a rack bar formed on the supporting member, a sliding member adapted to slide on the supporting member, a lever pivoted in said sliding member and having teeth formed thereon whereby rotation of the lever may cause the teeth of the lever to engage the rack bar to reciprocate the sliding member and means for disengaging said teeth from the rack bar, so that the place at which the teeth engage the rack bar may be varied.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of my improved device.

Fig. 2 shows a similar view, illustrating the possibilities of adjusting the device for different sized bottles.

Fig. 3 shows an end elevation of the device.

Fig. 4 shows an enlarged, detail, sectional view illustrating the manner in which the height of the bottle capper may be varied.

Fig. 5 shows an enlarged, detailed, sectional view taken on the line 5—5 of Fig. 6.

Fig. 6 shows a top or plan view of the device.

Fig. 7 shows an elevation of the rack bar to illustrate the manner of forming the teeth; and Fig. 8 shows an enlarged, detail, sectional view illustrating the manner in which the capping device is fixed to the stand upon which the bottle rests.

Referring to the acompanying drawings, I have used the reference numeral 10 to indicate generally a base, which may be formed from wood. Extending upwardly from position adjacent to one end of the base 10 is a casting comprising a clevis having vertical members 11 and 12, terminating in a yoke 13, from which a rack bar 14 extends upwardly.

The forward edges of the rack bar have teeth 15 formed thereon. The members 11 and 12 are connected together at their lower ends by a transverse bar 16, which has its central portion offset at 17 to form shoulders. A groove is formed in the board or base 10 adapted to receive the transverse bar 16 and to engage the surfaces thereof, whereby when bolts 18 are extended through the bars 16 and the base 10, the coaction of the bolts and the surfaces of the grooves and the bar 16 will hold the members 11 and 12 in a vertical position.

It will be seen that the shaping of the groove to fit the upper surfaces and side edges of the bar 16 makes it unnecessary to provide additional supports to hold these parts in substantially vertical positions.

Mounted on the rack bar 14 is a casting adapted to slide up and down on the rack bar and to pivotally support a lever 19. This casting, which I have designated generally by the letter "A" comprises spaced side walls 20, which engage the sides of the rack bar 14. Transverse back members 21 are spaced vertically from each other and engage the rear edge of the rack bar 14. Spaced front members 22 and 23 connect the members 20 in front of the rack bar 14. One side wall 20 is extended forwardly as at $20^a$ and pivotally supports a pin 24. The other side wall member 20 is extended forward and the upper part thereof is offset at $20^b$ to form a pocket.

Adjacent to the central portion of the pocket, the opposite end of the pin 24 is supported. The transverse front member 23 is extended forward and forms a bottle capping member "B" at the lower end of the casting "A". Pivotally supported on the pin 24 is a hand lever 19, which has a segmental gear 25 formed on its inner end and adapted to engage the teeth 15 of the rack bar 14, so that rotation of the lever 19 will cause vertical reciprocation of the casting "A" relative to the rack bar 14 and the base 10.

From the construction of the parts just described, it will be seen that if a bottle "C" be placed on the base 10 adjacent to the arms 11 and 12 and a cap, indicated by the dotted lines at 26, be placed upon the bottle, the rotation of the lever 19 will cause vertical reciprocation of the casting "A" thereby bringing the sealing recess "B" into contact with the cap 26 and sealing the latter to the neck of the bottle.

Referring to Fig. 1, it will be seen that when the lever 19 is in horizontal position, then a downward pressure on the end of the lever will exert a maximum pressure against the sealing recess "B", so that it is desirable that means be provided to have the parts in position with the lever 19 horizontal when the sealing recess "B" is accomplishing the sealing of the cap to the bottle.

Bottles, however, are of different heights and sizes so that means must be provided for adjusting the distance of the casting "A" from the platform 10 in order to accommodate different sized bottles. I accomplish this result by the following means. The offset portion $20^b$ of the casting "A" is of sufficient size to permit the segmental gear 25 to be slid laterally upon the pin 24 when the lever 19 is in substantially horizontal position. This is accomplished by forming the bottom web 27 of the pocket or offset portion $20^b$ of such a height that it will coact with the flattened side 28 of the segmental gear to permit the latter to be moved laterally only when the lever is in substantially horizontal position.

When the segmental gear is moved into the pocket as mentioned, it will be seen that the casting "A" may be moved freely up and down the rack bar 14 and the segmental gear 25 may again slide laterally into engagement with the teeth 15 when the casting "A" is in such position that the recess "B" is alined horizontally with the top of the neck of the bottle, which is to be sealed.

It will thus be seen that the shoulder 27 and flattened side 28 render it easy for the operator to determine the proper position for the casting "A", as if the bottle to be sealed be placed beneath or adjacent to the casting, then the casting may be moved to position with the recess "B" alined horizontally with the top of the neck of the bottle, and the lever 19 must be in horizontal position on account of the shoulder 27 and flattened portion 28, when the segmental gear is moved back into engagement with the teeth 15. These parts also make it impossible for the segmental gear to slide out of engagement with the neck, except when the lever is in horizontal position.

In order to obviate danger of the latter situation, the teeth 15 are tapered, so that they become smaller on the side opposite the pocket $20^b$, as is illustrated in Fig. 7. The teeth on the segmental gear 25 are tapered in the opposite direction, so that movement of the segmental gear on the rack bar ordinarily tends to throw the rack bar against the wall $20^a$ and thereby prevents the segmental gear from being accidentally thrown out of engagement with the rack bar.

In this connection, attention is drawn to the fact that the tapering of the teeth mentioned amounts to approximately a one-hundredth of an inch for each tooth, so that I have not attempted to illustrate this tapering in the drawings, except in Fig. 7, and in that figure, inclination of the teeth has been greatly exaggerated in order to bring out the principle of the construction.

An advantage of my improved device resides in the fact that it may be adjusted with a minimum amount of effort to seal bottles of various heights when the operating lever is in position to exert a maximum pressure upon the sealing recess.

A further advantage of my invention resides in the vertical reciprocation of the casting "A," whereby a straight downward force is exerted on the bottle, thereby minimizing danger of breaking the bottles.

Some changes may be made in the construction and arrangement of the parts of my improved device, without departing from the essential features and purposes of my invention, and it is my intention to cover by my claims any modified forms of structure or use of mechanical equivalents, which may be reasonably included within their scope.

I claim as my invention:

1. In a device of the class described, a base, a rack bar secured thereto and extending upwardly therefrom, a sliding member mounted on said rack bar comprising guides adapted to engage the rack bar, a bottle sealing head, and an offset portion adapted to form a pocket, and a lever pivotally mounted in said sliding member having a segmental gear formed at its inner end adapted to engage the teeth of the rack bar, said segmental gear and pocket being in alinement whereby the segmental gear may be moved laterally into said pocket and out of engagement with the teeth of the rack bar.

2. In a device of the class described, a base, a rack bar secured thereto and extending upwardly therefrom, a sliding member mounted on said rack bar comprising guides adapted to engage the rack bar, a bottle sealing head, and an offset portion adapted to form a pocket, and a lever pivotally mounted in said sliding member having a segmental gear formed at its inner end adapted to engage the teeth of the rack bar, said segmental gear and pocket being in alinement whereby the segmental gear may be moved readily into said pocket and out of engagement with the teeth of the rack bar, the teeth of said rack bar and segmental gear being tapered in opposite directions, whereby the accidental slipping of said segmental gear out of mesh with said rack bar will be prevented.

3. In a device of the class described, a base, a rack-bar secured thereto and extending upwardly therefrom, a sliding member mounted on said rack-bar comprising guides adapted to engage the rack-bar, a bottle-sealing head, and an offset portion adapted to form a pocket, and a lever pivotally mounted in said sliding member and having a segmental gear formed at its inner end adapted to engage the teeth of the rack-bar, said segmental gear and pocket being in alinement whereby the segmental gear may be moved laterally into said pocket and out of engagement with the teeth of the rack-bar, said lever and pocket having portions which engage and prevent lateral shifting of said gear segment except when the lever is in a predetermined position.

4. In a device for applying closures to bottles, the combination of a base, an upright formed with a rack portion at its upper end and spaced apart legs at its lower end at which said upright is connected with said base, a slide movable on said upright and having spaced apart extensions projecting beyond the teeth of said rack portion, a closure-engaging member carried by said slide, a gear segment pivoted between said spaced extensions and meshing with said rack portion, means carried by said slide to permit movement of said gear segment in a plane lengthwise of the axis on which the latter is pivoted, out of engagement with the teeth of said rack bar, and an operating handle carrying said gear segment.

CLAUDE B. MELCHIOR.